United States Patent [19]
Fassell et al.

[11] 3,852,192
[45] Dec. 3, 1974

[54] REACTOR FOR WET OXIDATION OF ORGANIC MATTER

[75] Inventors: W. Martin Fassell, Newport Beach; Donald W. Bridges, Irvine, both of Calif.

[73] Assignee: Barber-Colman Company, Rockford, Ill.

[22] Filed: Oct. 4, 1973

[21] Appl. No.: 403,652

Related U.S. Application Data

[63] Continuation-in-part of Ser. No. 346,152, March 29, 1973.

[52] U.S. Cl..................... 210/63, 23/285, 23/290, 210/179, 210/219, 210/220
[51] Int. Cl............................................... C02b 1/34
[58] Field of Search ......... 162/31; 209/182; 210/10, 210/63, 67, 71, 179, 181, 219, 220, 221, 319, 320; 261/93; 23/285, 286, 290, 292

[56]  References Cited
UNITED STATES PATENTS

| | | | |
|---|---|---|---|
| 3,503,514 | 3/1970 | Lawson | 210/320 X |
| 3,547,813 | 12/1970 | Robinson et al. | 261/93 X |
| 3,549,529 | 12/1970 | Wiseman | 210/63 |
| 3,617,538 | 11/1971 | Bogert | 210/181 X |
| 3,649,534 | 3/1972 | Schotte | 210/63 |
| 3,655,343 | 4/1972 | Galeano | 210/63 X |
| 3,761,409 | 9/1973 | McCoy et al. | 210/63 |

OTHER PUBLICATIONS
Technical Note, Summary of the Technology of Wet Oxidation, 4/3/72, Barber-Colman Company.

*Primary Examiner*—Samih N. Zaharna
*Assistant Examiner*—Robert H. Spitzer
*Attorney, Agent, or Firm*—McDougall, Hersh & Scott

[57] ABSTRACT

A reactor for wet oxidation of organic matter in solution or dispersion in aqueous medium in which the reactor is in the form of an elongate horizontally disposed cylindrical housing subdivided into compartments by vertical walls having passages therethrough for communicating one compartment with the other and which subdivide the compartments into an upper vapor zone and a lower liquid zone and which includes means for high agitation of the aqueous medium within the liquid zone and the introduction of oxygen containing gas into the compartments in the vicinity of high agitation for distribution of the oxygen containing gas as fine bubbles into the aqueous medium for intimate association with the organic matter to provide active oxidation sites and for rapid transport of free radicals that are formed to the active oxidation sites to enable wet oxidation reaction to be carried out at lower temperatures and whereby unreacted oxygen in the vapor zone is re-entrained within the aqueous medium in the compartment and in adjacent compartments for fuller utilization of the oxygen and for more efficient oxidation reaction.

25 Claims, 4 Drawing Figures

REACTOR FOR WET OXIDATION OF ORGANIC MATTER

This is a continuation-in-part of our copending application Ser. No. 346,152, filed Mar. 29, 1973, and entitled "Wet Oxidation Process."

This invention relates to the oxidation in aqueous medium of organic matter suspended or dissolved therein and referred to commerically as wet oxidation.

Wet oxidation is a form of oxidative combustion in which organic waste or other organic matter is disposed of while dissolved or suspended in a liquid, usually water. Wet oxidation can be carried out at practical rates only at elevated temperature, considerably above the normal boiling point temperature of water, and at elevated pressure. For this purpose, the aqueous solution or slurry of combustible organic matter is confined within a reactor capable of maintaining the materials under the desired temperature and pressure and under oxidizing conditions to achieve the desired rate of oxidation.

Wet oxidation is a safe, efficient and economical technique for destroying organic waste, such as slimes, sludges and other organic matter, without the need to perform expensive evaporation or desiccation, as would be required before the waste could be burned, as by current incineration techniques. For example, before sewage can be destroyed by incineration, it is necessary materially to reduce the water content of the sludge which is normally in excess of 90 percent water. As a result, much of the energy required for destruction by incineration is consumed in water removal and a great part of the space, labor and equipment is employed in material handling for such water removal step.

Wet oxidation is also adapted for use in the disposal of toxic or hazardous organic material, such as many organic plastics, explosives and the like combustible organic substances, without the danger of air pollution or explosion since oxidative combustion can be controlled during wet oxidation because the latter is carried out under water.

The amount of combustible organic matter in suspension or solution in the aqueous medium is generally defined by reference to the amount of oxygen theoretically required to react with the organic material for destruction thereof, identified in the trade as chemical oxygen demand (COD). The term BOD is also used in somewhat the same manner to define the biological oxygen demand for consumption of organic matter by biological means. Removal or destruction of organic matter, chemically or biologically, is measured by percent reduction in COD or BOD, respectively. 100 percent reduction in COD refers to complete destruction by chemical oxidation of the combustible organic matter present in the material. Wet oxidation is an exothermic chemical oxidation process wherein combustion proceeds at various rates depending somewhat upon the concentration of combustible organic matter dissolved or suspended in aqueous medium, the availability of oxygen in the liquid system and the size of the organic molecules. The reaction rate depends more completely upon the temperature and pressure at which the wet oxidation reaction is carried out. With reference first to the molecular size, organic macro molecules appear to react more readily than molecules of lower molecular weight, with greatest difficulty being experienced in oxidative reaction reaction of the lower forms of oxidation reaction products, such as acetic acid and the like. As a result, a percent reduction in COD proceeds more rapidly initially as the macro molecules, present in large proportions in the original liquor, are subjected to oxidation and to cleavage into smaller molecular weight fragments, which tend to accumulate as oxidation proceeds by reason of their greater resistance to oxidation under equivalent conditions. Thus the rate of wet oxidation slackens as the concentration of smaller organic molecules increases in solution or suspension in the aqueous medium. This change in rate is rather pronounced at or about the point of percent reduction in COD within the range of 60–70 percent. Often times the reduction in reaction rate is to almost one-third the rate of original oxidation.

The temperature and, as a result, the pressure is a significant factor in the rate and amount of oxidation. In the past, substantially total destruction by wet oxidation has been achieved only at very high temperatures of the order of about 550°–600°F and at correspondingly high pressures within the range of 1,500–2,000 psig. This has limited the acceptance of the process in commercial practice for disposal of organic waste because of the excessive demand for expensive equipment capable of withstanding the conditions existing during reaction including the highly corrosive characacter of the materials being processed.

Use has been made of a wet oxidation process in accordance with the teachings of the following Zimmerman and Zimmerman et al patents and which has been defined commercially as the "Zimpro" process: U.S. Pat. Nos. 2,665,,249; 2,824,058; 2,903,425; 2,932,613; 3,272,739, and 3,442,798. The "Zimpro" process is essentially a batch process which makes use of a reaction tower filled with the watery waste, in which the organic matter is maintained in an amount within the range of 3–5 percent by weight and oxygen is provided for concentration therein in an amount within the range of 1–2 percent by weight, with the oxygen usually provided in the form of air.

For the destruction of organic waste, the reaction is carried out at a temperature within the range of 500°–550°F and at a pressure usually within the range of 1,500–2,000 psig. Because of the corrosive character of the material under these conditions and the high pressures and temperatures under which the reaction is carried out, the cost of original equipment is excessive and the operative life of the equipment is relatively short thereby to pose a substantial barrier to the commercial acceptance of the described process for sewage sludge disposal.

In the attempt to make the "Zimpro" process more acceptable, modifications have been made for operation at lower temperatures and pressures, but this has resulted in a relatively inefficient process which operates primarily to dewater the sewage sludge as distinguished from achieving a desired percent reduction in COD necessary for producing a relatively pure effluent for disposal without the danger of pollution.

Thus, it is an object of this invention to provide a method and apparatus whereby wet oxidation can be carried out economically and efficiently, on a commercial scale, with less expensive equipment and with less maintenance; in which the oxidation reaction for percent reduction in COD can be carried out at a high rate while operating at lower temperatures and/or lower temperatures and pressure; in which efficient utilization is made of the oxygen containing gas introduced into the reaction mixture, and in which wide variation in concentration of combustible organic matter or variation in the ease of oxidation can be tolerated without raising problems with respect to process control or equipment.

These and other objects and advantages of this invention will hereinafter appear, and for purposes of illustration, but not of limitation, an embodiment of the invention is shown in the accompanying drawings, in which FIG. 1 is a top plan view, partially in section, of a reactor embodying the features of this invention for wet oxidation of organic waste;

Figure 1:
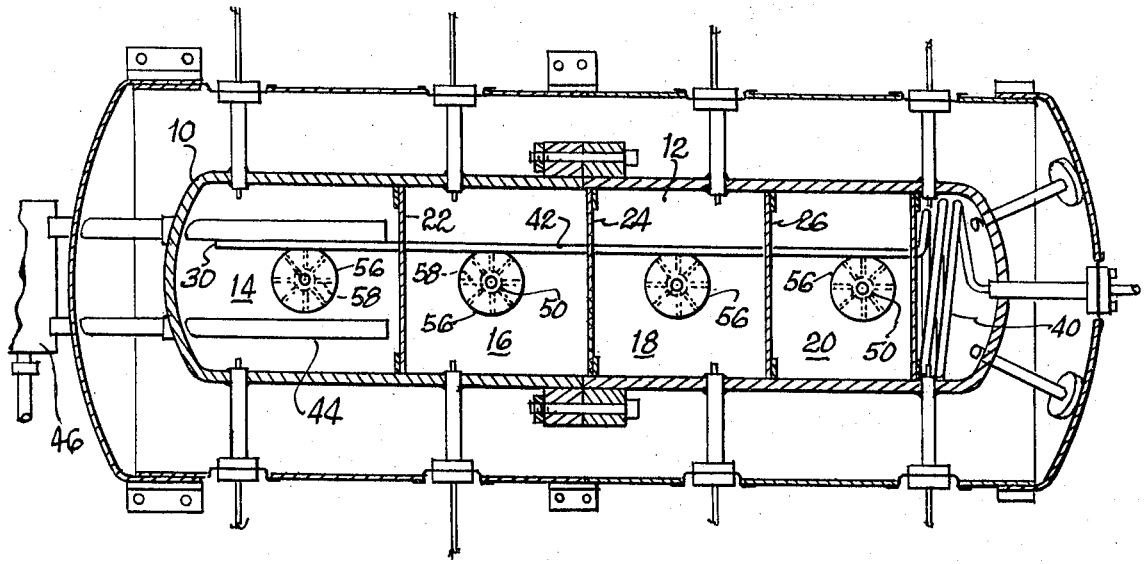
Figure 2:
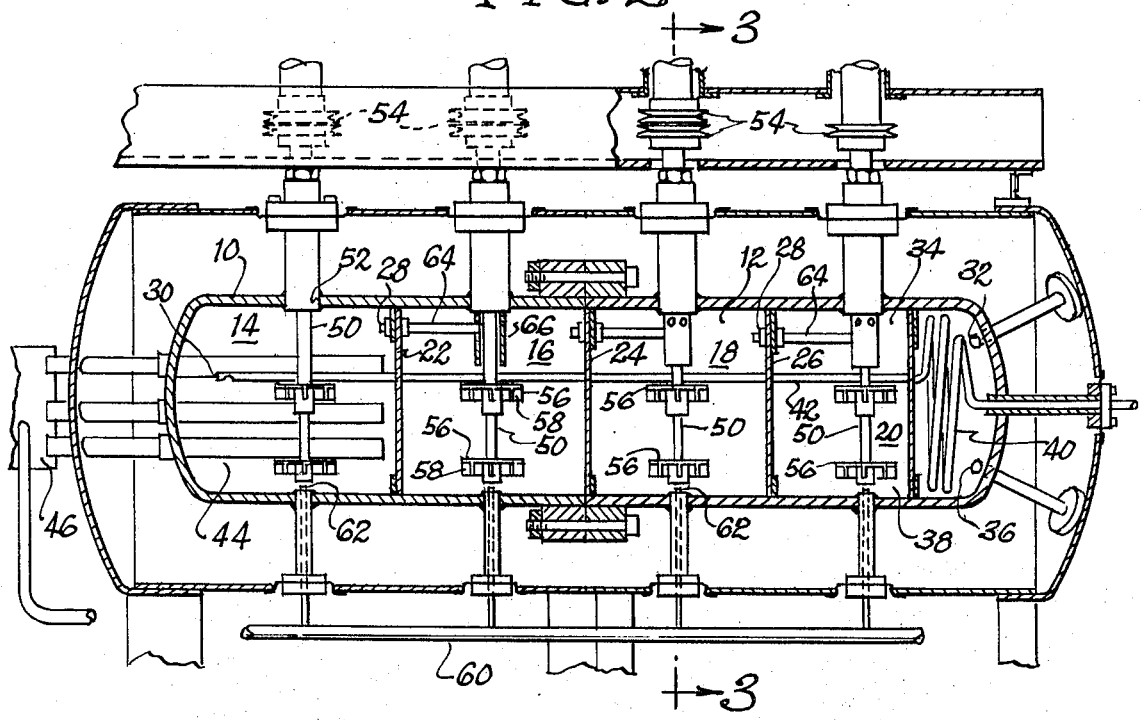
FIG. 2 is a side elevational view, partially in section, of the reactor shown in FIG. 1.
Figure 3:
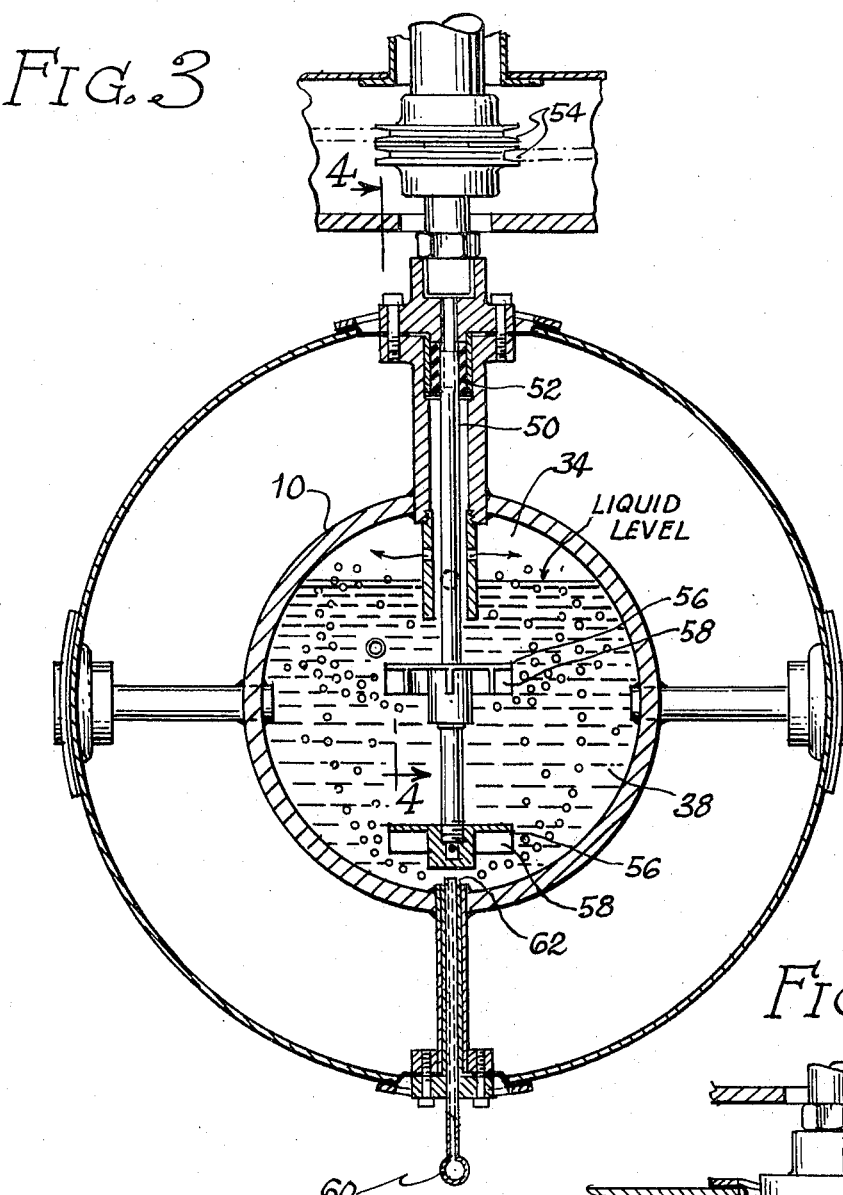
FIG. 3 is a sectional view taken along the line 3—3 of FIG. 2.
Figure 4:
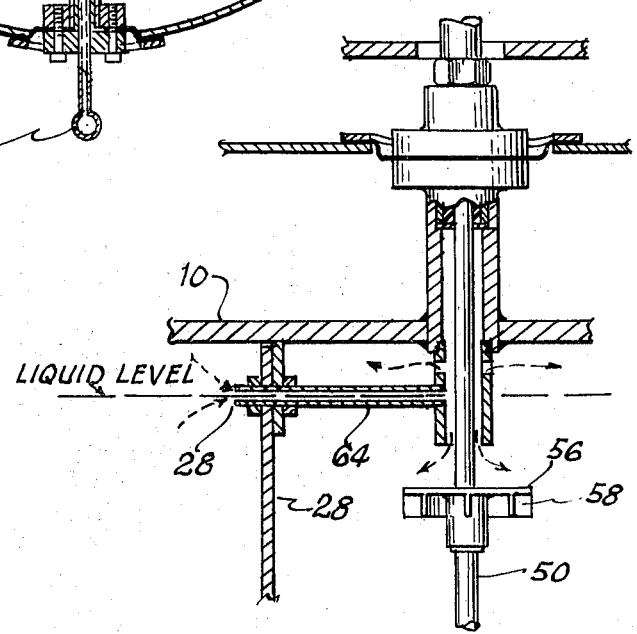
FIG. 4 is a sectional view through the axis of a stirrer showing the mounting in sealing relation in a supporting bearing for extension through the top wall of the reactor.

In our aforementioned copending application, description is made of a reactor for carrying out wet oxidation of sewage and sludge, wherein the reactor is in the form of a horizontally disposed cylindrical housing that is subdivided into side by side compartments by one or more vertically disposed baffles which extend about three-fourths of the distance from the bottom to the top of the reactor. The baffles are provided with central notches that serve as weirs to enable flow of fluid from one compartment to the other for travel of the liquid generally in one direction through the reactor. Each compartment is provided with means for agitating the liquid therein, such as in the form of a stirrer mounted on a central shaft for rotational movement at high speed in the central portion of the compartment and means are provided for the continuous introduction of air or other oxygen containing gas at a level below the surface of the liquid for admixture therewith. In the modification described in the aforementioned copending application, the stirrer is in the form of a hollow shaft which enables the oxygen containing gas to be introduced through the shaft into the liquid to a level below the stirrer.

The sewage solution or waste, in aqueous solution or dispersion, is introduced continuously into the first compartment for flow, under steady conditions, from the one compartment to the next with the level of liquid in each compartment corresponding to the level of the weir over which the liquid flows from the one compartment to the other. The last compartment is utilized for disengagement of the vapor from the liquid so that the vapor can be removed through an outlet in communication with the vapor space at the top, and the liquid can be removed as effluent through an outlet in communication with the liquid space at the bottom.

The compartments are maintained under the same pressure by reason of their common vapor space at the top, although variation in temperature between compartments can be maintained to some degree. In general, the reactor is operated with the materials at a temperature within the range of 400°–480°F and at a pressure above autogenous pressure and preferably 50–200 psig above the autogenous pressure for the liquid phase.

Improvement in the reactor design and operation is illustrated in the accompanying drawing in which 10 indicates the reactor in the form of an elongate, horizontally disposed cylindrical housing formed of titanium, 316 stainless steel, or other high strength metal capable of resisting corrosive attack by the fluids contained therein under high temperature and pressure and under oxidizing conditions. Instead, use can be made of a metal cylinder of high strength lined with a suitable material for resisting corrosive attack, such as with titanium, 316 stainless steel, acid bricks, carbon bricks and the like, with or without a lead lining, and in which the bricks are preferably bonded with an acid-proof cement, such as C–6 of National Carbon. The latter constructions are more suitable for reactors of large capacity.

The reaction chamber 12 is subdivided into separate compartments 14, 16, 18 and 20, in side by side relation, by vertical walls 22, 24 and 26, respectively, which extend from the bottom to the top of the reactor. Communication between the adjacent compartments is provided by a passage 28 through the separating walls, located in the upper portion of the compartments. Location of the communicating passages is significant since the level of the communicating passage defines the level to which the liquid phase can rise within the compartment and the amount of vapor space above the liquid level in each compartment. The importance of the vapor space will hereinafter be described but it may be stated here that it is desirable to provide for a vapor space which is within the range of 10–50 percent of the total volume of the compartment and preferably within the range of 15–20 percent of the total volume. The compartment 14, at one end, is provided with an inlet 30 through which aqueous slime, sludge or waste is continuously introduced into the compartment for flow from compartment to compartment through the interconnecting passages until it reaches the last compartment 20. The last compartment is provided with an outlet 32 in communication with the vapor space 34 at the top for removal of steam, nitrogen, unused oxygen, carbon dioxide and other vapors which separate out in the vapor space 34. The last compartment is provided with a second outlet 36 in communication with the liquid space 38 in the lower portion of the compartment for removal of liquid effluent from the reactor.

Since the wet oxidation reaction is highly exothermic and considerable heat is generated during the reaction, it is desirable to recover much of the heat as energy for possible use before it is wasted into the atmosphere. Thus, in the illustrated modification, a heat exchange coil 40 is provided in the last compartment 20 through which the sewage or sludge is circulated from a feed source (not shown) for passage through the coils in heat exchange relation with the hot liquids and gases for preheating the liquid feed before flow through the conduit 42 to the inlet 30 in the first compartment. It will be understood that the effluents, both vapor and liquid, from the last compartment may be further processed in heat exchange relation with other fluids and gases for the recovery of heat and energy therefrom and that energy may also be recovered from let-down of the pressure of the vapors and liquids exhausted from the last compartment before release thereof.

Heat exchange coils 44 are also provided in the first compartment for purposes of controlling temperature of the liquid phase in the first compartment. Initially, heat exchange fluid can be circulated through the header 56 through the coils 44 to raise the temperature of the liquid phase to initiate the oxidative reaction. Thereafter, the exothermic oxidation reaction is usually sufficient to maintain reaction temperature in the first and succeeding compartments and often times the amount of oxidation occurring in the first compartment is sufficient to require the removal of heat, at which time a coolant liquid or vapor can be circulated through the coils 44 for extraction of heat from the liquid phase.

The compartments in which the oxidative reaction takes place are each provided with means for agitation to maintain the liquid phase under a high state of movement. By way of an example, a desired degree of agitation is achieved in the illustrated modification by means of a high speed stirrer having a shaft 50 which extends downwardly for rotational movement about a vertical axis through the top wall of the compartment, preferably in alignment with the center thereof. Passage through the top wall of the reactor is by means of a sealed bearing 52 rotatably to support the stirrer shaft in a manner to prevent escape of vapors and the high pressures to be retained within the compartment. The portion of the shaft extending outwardly beyond the housing is provided with sheaves 54 for engagement by a belt drive or the shaft may be provided with suitable gears for motor drive in rotational movement.

Fixed to the shaft, below the level of the liquid, is a pair of vertically spaced mechanical stirrers in the form of a disc plate 56 having radially extending blades 58 projecting downwardly from the bottom side thereof.

The compartments 14, 16, 18 and 20, which are in the shape of a cylindrical section, are believed to provide for most efficient mixing and reaction, with the stirrer operating in the center thereof, the lowermost stirrer being located preferably about one-third of the distance from the bottom while the other is located about two-thirds of the distance from the bottom of the reactor, but still below the liquid level. It will be understood that the shape of the compartments, location of the stirrers and the number of stirrers are not limiting factors since compartments of other shapes can be used and the number of stirrers and their spacing can be varied over fairly wide limits from a single stirrer to a number of stirrers.

The air or other oxygen containing gas is introduced into the compartments in the vicinity of maximum agitation to effect breakdown of the air into fine bubbles which are uniformly distributed throughout the liquid phase for intimate association with the combustible organic material in solution or suspension in the aqueous medium to provide active oxidation sites. Combustion of the organic matter by oxidation is effected with the generation of free radicals which have extremely short life. Such free radicals have been found to be valuable as agents for catalyzing the oxidation reaction whereby it becomes desirable to transport such free radicals, as they are formed, to the reaction oxidation site to catalyze the oxidation reaction before the free radicals expire. This is accomplished by providing a state of high agitation in the area of introduction of the oxygen containing gas whereby the generated free radicals are immediately transported to active oxidation sites. In this manner, the rate of oxidation can be materially increased whereby the wet oxidation of combustible organic matter can be achieved either at a higher rate, at pressures and temperatures currently employed in commercial operation, or at a much lower temperature than currently used in commercial practice without departing from the acceptable rate of oxidation.

By way of example, in the illustrated modification, the air or other oxygen containing gas is supplied at the desired pressure from a compressor or accumulator through line 60 to nozzles 62 adjacent the bottom side of the lowermost stirrer 58 continuously to introduce the stream of air or oxygen containing gas in the direction towards the area of maximum agitation and preferably into the vortex of the stirrers of the type shown in the drawing. The nozzle or nozzles 62 can be located in alignment with the center of the stirrer or offset from the center thereof, but preferably within the span of the stirrer vanes for interaction with the vigorously agitated liquid phase. It will be understood that other means for agitation can be employed and that more than one nozzle for better coverage can be used.

The passage 28, communicating the adjacent chambers, can be merely in the form of an opening through the separating wall at the desired level but it is preferred, in accordance with an important concept of this invention, to make use of a horizontally disposed hollow tubular member 64 which has its inlet in one compartment and extends into communication with an intermediate portion of a vertically disposed downpipe 66 concentrically arranged in spaced relation about the stirrer rod 50 in the next compartment. The downpipe 66 is provided with openings in the upper end portion in communication with the vapor space, while the lower exit end extends to a level below the level of the liquid phase in the compartment. Thus the fluid which enters the tubular member 64 in the one compartment flows at a sufficiently slow rate therethrough to enable separation into a vapor phase which rises through the downpipe 66 for issuance into the vapor space of the next compartment, and a liquid phase which flows downwardly through the downpipe for introduction into the next compartment below the liquid level.

More than one passage and connecting tubular member can be provided through each separating wall. Such passages and connecting tubular members are desirably at lower levels through succeeding walls for purposes of utilizing gravitational forces to insure flow of fluid in one direction from the inlet end of the reactor to the outlet end. The differences in level need not be great since the desired flow characteristics can be made available by differences in levels of as little as 1 inch from one wall to the next.

The concept for maintaining a vapor space in each compartment and for flow of vapor and liquid from one compartment to the next plays an important role in the efficient operation of the reactor for fuller utilization and for better utilization of the oxygen available for combustion of the organic matter and for combustion of the organic matter in greater amount and at a higher rate. In the absence of the combination of a high state of agitation of the liquid and of a vapor space, under comparable pressure and temperature conditions, only s small fraction of the oxygen introduced into the liquid phase remains dissolved in the liquid and only a small fraction of the dissolved oxygen is utilized in the wet oxidation reaction for combustion of organic matter.

Thus utilization is made of only a small fraction of the oxygen otherise available for combustion of the organic matter and the concentration of oxygen available in the liquid for reaction is minimized. On the other hand, when wet oxidation of organic waste is carried out in accordance with the practice of this invention, undissolved oxygen accumulates in the vapor space as a reservoir of additional oxygen which is returned, for utilization, by the turbulence of the liquid in a high state of agitation. This amounts to re-entrainment of oxygen whereby the oxidation available in the liquid phase for maintaining reactive sites is maximized while continuous re-entrainment of the oxygen containing gas provides for fuller utilization of the oxygen made available to the system. Thus the oxygen is maintained in the system in a state of optimum availability for carrying out the oxidation combustion of dissolved or suspended organic matter whereby markedly to improve the rate of oxidation, the percent conversion per unit weight of oxygen introduced into the system and the percent reduction in COD.

Separation of the compartments, other than by way of the communicating passages, provides for reexposure of unreacted oxygen, in one compartment, to oxidative reaction in the next compartment as the vapor phase from the one compartment flows to become a part of the vapor phase in the next. Thus the unreacted oxygen is preserved for continuous reexposure to oxidative combustion of the organic matter as it flows from the one compartment to the next, thereby to reduce the amount of oxygen required to be introduced into the compartments representing subsequent stages of the wet oxidation process. This not only reduces the demand on equipment, but it also reduces the amount of pressurized oxygen containing gas required to be introduced into the system, thereby further to reduce any contamination introduced with such gas and the amount of material carried off into the atmosphere with the gaseous effluent.

Maintenance of a vapor space of definite volume not only provides a reservoir of unreacted oxygen for utilization in the wet oxidation process, but the vapor space is significant in that the wet oxidation process is thereby rendered selfcontrolling from the standpoint of temperature and pressure in that it is capable automatically to compensate for changes in reaction rate due to changes in the composition of the feed or the like. As is well known, the oxidation reaction for combustion of organic matter is highly exothermic. The amount of heat generated in any one compartment of the reactor depends somewhat upon the amount of combustible organic matter in the liquid, its chemical oxygen demand, as well as the type of organic matter that is being subjected to oxidative combustion, since some organics, such as cellophane, organic propellants and the like, oxidize more readily than others to permit a higher reaction rate with corresponding increase in the rate of heat generation.

For example, during steady operation at a temperature of 450°–475°F and a pressure of about 550 psig, a change in feed to introduce an organic waste which increases the amount of oxidative combustion, as by introducing a feed having a COD of 80,000 mg/l 0, instead of a feed having a COD of 20,000 mg/l 0, or by the introduction of a feed in which the organic waste is in the form of a propellant or explosive, the amount of exothermic heat generated in the compartment increases materially. In the reactor of applicants, wherein the reactor compartments embody a vapor space in the amount described, the increased amount of heat generated is utilized in the conversion of additional water to steam for automatic control. Change to introduce a feed with less COD results in the conversion to generate less steam so that the amount of heat removed automatically becomes less. This same versatility is not available in conventional tower reactors of the type currently employed where the tower is substantially filled with the liquid phase. In the absence of any effective means for heat removal, such tower type reactors are continuously confronted with the danger of explosion.

The use of an excessive amount of vapor (head) space is undesirable since it reduces the overall capacity of the reactor. When the compartment is less than one-half full, insufficient utilization is made of the reaction space and mixing is poor. Thus a vapor space corresponding to 50 percent of the volume of the compartment represents the maximum, but for practical purposes it is undesirable to make use of a vapor space which exceeds 40 percent of the volume. On the other hand, the desired results are not obtained with a vapor space of less than 10 percent of the volume of the compartment.

In the preferred practice of the invention, use is made of reactor compartments having a head or vapor space within the range of 15–20 percent of the volume. The vapor space can be varied from compartment to compartment merely by variation in the level of the passage communicating the one compartment to the other which determines the liquid level in the forward compartment.

Since wet oxidation is carried out at elevated temperatures and pressures, under highly oxidizing conditions, with materials of various compositions, the elements within the reactor, including the interior walls of the reactor, the separating walls, the agitators, the tubular connectors, the heat exchangers and the like, should be fabricated of materials which are resistant to corrosion under the operation conditions, such as titanium, 316 stainless steel and the like. In reactors of large capacity, it is practical to fabricate the housing of conventional high strength materials and provide the unit with a corrosion resistant lining such as lead, acid or carbon bricks interbonded with an acid-proof cement, such as National Carbon C–6 cement.

Wet oxidation is carried out in a reactor of the design of the type descibed at reduced reaction temperatures, such as within the range of 400°–480°F and preferably within the range of 420°–465°F and at a pressure above autogenous pressure and preferably within the range of 50–200 psig above the vapor pressure of water at the reaction temperature. The air or other oxygen containing gas is pressurized for introduction to slightly higher pressures. Such pressure conditions provide for solubility of sufficient oxygen in the liquid phase without unduly increasing the cost of equipment and operation.

When use is made of relatively pure oxygen, the operating pressures can ordinarily be less than when air is used.

The rate at which the air or other oxygen containing gas is admitted into the reaction zone is determined somewhat by the quality (COD) of the organic waste material being treated, the quantity of such material in volumes per unit time, and the desired degree of oxidation. Ordinarily, the minimum input of oxidizing gas corresponds to the stoichiometric amount required for oxidation of the combustible organic material, that is the amount of oxygen needed to reduce the COD of the feed to a predetermined level. It has been found, however, that even with efficient utilization of oxygen, in accordance with the practice of this invention, the oxygen input should be within the range of 1.1 to about 2 times the theoretical amount required to reduce the COD to zero.

The reaction can be carried out at normal pH of the aqueous solution or dispersion of the sludge, sewage or the like, but combustion of the organic matter can be accelerated, under the described conditions, when the reaction is carried out under acidic conditions, preferably with the liquor at a pH within the range of 1.5 to 7.0. For this purpose, use can be made of organic or inorganic acids but it is preferred to make use of sulphuric acid for pH adjustment.

In the treatment of raw sewage or sludge, the latter can be introduced directly into the reactor or it can be subjected to one or more pretreatments including primary sedimentation or screening for physical separation to remove particles beyond a predetermined size whereby some 30–60 percent of the BOD is removed. The solid materials screened from the sewage can be dried and burned.

Pretreatment may also include a sedimentation step for separation into a solid effluent which represents the sewage sludge fed to the reactors and a liquid effluent of suspended solids and solution which can be processed through a biological treatment, such as an aerobic oxidation or fermentation to produce an activated sludge. From the biological treatment, the effluent can be processed by sedimentation to yield an activated sewage sludge which may be returned in part to the primary sedimentation and/or in part to the reactor for wet oxidation.

EXAMPLE 1

This example illustrates the wet oxidation of a simulated shipboard waste, using a multiple-stage compartmented reactor of the type described. The waste has not been subjected to any pretreatment, such as aerobic microbial digestion.

The reactor comprised a horizontally disposed cylindrical vessel having an internal diameter of 10 inches and an internal length of 42 inches, the walls of which were lined with carbon. Three titanium baffles divide the vessel into four equally sized compartments. The tubular connectors between compartments were at a level to provide a vapor space of about 15 percent of the total volume of each compartment. The feed material was introduced into the first compartment through an inlet near the top of the vessel and was discharged from the last compartment through an outlet slightly above the center line. The turbine type agitator, formed of welded titanium, comprised disc members having a diameter of 3 inches and eight blades of ⅜ inch by ¾ inch radially arranged on the underside of each disc in equally circumferentially spaced apart relation, with the lower disc located approximately one-third from the bottom of the reactor while the upper disc was about two-thirds of the distance from the bottom.

The reactor was fed by a blow-case pump system which injected one liter of aqueous waste into the first compartment during a 20 second injection period of an approximately 2 minute pumping cycle, the liquid being passed through a heat exchanger to provide proper pretreatment temperature.

Sulphuric acid was added in the amount of 6 grams per liter to the aqueous waste before injection into the reactor to adjust the pH to the acid side.

The aqueous waste was prepared by macerating the daily waste of one person, diluting it to 35 gallons, the waste being made up of the following:

Composition of Influent

Table Scraps
　Shells from two eggs
　Grease from frying two eggs
　Coffee grounds from percolating six cups
　Trimmings from one steak
　Remains from one salad
　Remains from one serving of beef and noodles
　Peels from one orange
　One-third slice of bread Toiletries
　Shaving cream from one shave
　Toothpaste from one brushing Body Waste
　Feces from one individual, collected over a
　　24-hour period (Est. 100–150 gm.)
　Urine, one quart Municipal Water
　Thirty-five gallons.

The samples for analysis were taken at hourly intervals after steady operations have been achieved (after 2 hours of operation).

The material in the first compartment was maintained at a temperature of 470°–480°F; second compartment 460°–465°F; third compartment 430°–450°F, and fourth compartment 420°–440°F.

The reactor pressure was maintained at 600 psi max. and a steam pressure of 550 psi max. Air was introduced at the rate of 4.8 cubic feet per minute in amounts equally distributed between compartments and the aqueous waste was introduced at a rate of 0.433 liters per minute. The average residence time per compartment was about 15 minutes and the agitators rotated at a speed of 300 rpm.

Analysis of the streams for chemical oxygen demand (COD) was made in accordance with the procedure of "Standard Methods for the Examination of Water and Wastewaters," 13th Edition.

The following are the results that were obtained:

Results of Chemical Analysis: Test 1

| Sampling Time in hours | Sample Station | COD,mg/l 0 | | Percent Reduction in COD |
|---|---|---|---|---|
| 2 | Influent | 1975 | | — |
|  | Compartment 1 | 945 | | 52.2 |
|  | Compartment 2 | 626 | | 68.3 |
|  | Compartment 3 | 586 | | 70.3 |
|  | Compartment 4 | 529 | | 73.2 |
| 3 | Influent | 1715 | | — |
|  | Compartment 1 | 850 | | 50.4 |
|  | Compartment 2 | 559 | | 67.4 |
|  | Compartment 3 | 503 | | 70.4 |
|  | Compartment 4 | 407 | | 76.3 |
| 3:45 | Influent | 1809 | | — |
|  | Compartment 1 | 692 | ,670 | 61.7 |
|  | Compartment 2 | 551 | | 69.5 |
|  | Compartment 3 | 483 | | 73.3 |
|  | Compartment 4 | 393 | | 78.3 |

It will be seen from the foregoing that 73–78 percent reduction in COD was obtained within the one hour residence time within the reactor, with the maximum percent reduction being obtained in the first compartment as compared to the remaining compartments.

EXAMPLE 2

This example illustrates the practice of the invention in the continuous flow wet oxidation of NC-NG propellant.

Use was made of the four-compartment reactor illustrated in the drawing with the walls of the reaction chamber lined with carbon on which the specific are of carbon per volume of solution was 0.2 cm$^{-1}$ in each compartment. The run was conducted with 30 pounds of propellant introduced into the reactor as a slurry in tap water derived from the Colorado River containing 12 ml concentrated sulphuric acid per gallon (6 g/l $H_2SO_4$) and copper sulphate or catalyst in amount of $10^{-3}$ grams per liter.

The operating conditions and material balance are summarized in the following Table. The chronology of temperatures and chemical analysis are recorded in Table 2.

TABLE 1

| | |
|---|---|
| Operating Conditions: | |
| Reactor Pressure, psi | |
| Total: | 605, max. |
| Steam: | 430, max. |
| Reactor Temperature, °F | |
| Compartment 1 | 455–415 |
| Compartment 2 | 455–410 |
| Compartment 3 | 445–410 |
| Compartment 4 | 440–395 |
| Air Flow, scfm | |
| Total: | 2.2–2.7 |
| Residence Time, Min./Compartment: | 15–20 |
| | |
| Material Balance: | |
| Propellant Added to Reactor, lbs.: | 30 |
| Volume of Liquid Added, gal.: | 30 |
| Volume of Final Effluent, gal.: | 23.3 |
| Volume of Vapor Condensate, gal.: | 7.5 |
| Total COD Added, grams: | 9534 |
| Total COD, Final Effluent, grams: | 143 |
| Total COD, Vapor Condensate, grams: | 24 |
| Percentage Initial COD in Final Effluent: | 1.5 |
| Percentage Initial COD in Vapor Condensate: | .3 |
| Duration of Test, Hours: | 6 |
| Feed Rate, Over-All Average, lbs. Propellant per Hour: | 5 |
| Slurry Strength, Over-All Average, Weight %: | 11 |

The over-all percentage reduction in COD, based on the weighted means of effluent samples, was 98.2.

Settled effluent contained significantly less COD than unsettled effluent, as recorded in Table 2. Approximately two-thirds of the effluent COD is present as dissolved organic matter while the remainder is present as occluded in undigested solids.

Cursory infra-red spectral analysis indicates that the final effluent and vapor condensate contain chlorophenol, acetaldehyde, acetic acid, propionic acid and chloralamine.

EXAMPLE 3

This example illustrates the practice of the invention in the wet oxidation of photographic film.

The reactor and reaction conditions are somewhat the same as in Example 2.

In general wet oxidation of the photographic film resulted in only partial oxidation and solubilization. The substances which were organic in nature, namely the emulsion coating (mostly gelatin) and organic dyes, readily oxidized and liberated the inorganic silver salts. The film base partially oxidized in the acidic wet oxidation leaving insoluble terephthalic and related organic acids. Generally silver was occluded in the insoluble acids and came out mostly in the insoluble residue.

The final effluent had a COD of 270 mg/l 0 after two hours of wet oxidation from an initial mass of film of 33,210 mg.

Under acidic conditions, 25–55 percent by weight of the film remained as a solid residue after wet oxidation. On the other hand, 90 percent solubilization and about 70 percent by weight destruction of the organic film was achieved with ammoniacal wet oxidation of 30 grams film in 1,500 ml N-$(NH_4)_2$ $SO_4$ - 1.5 N $NH_4OH$.

It will be apparent from the described reactor design that one compartment is sufficiently independent of the other to maintain operating conditions within each compartment most favorable to the reaction for efficient combustion of organic matter. Thus one compartment in the reactor can be maintained at a higher or lower pressure, or at a higher or lower temperature by comparison with the other and/or one compartment may be supplied to provide for a greater or lesser amount of oxygen to tailor the composition to the particular conditions prevailing in the compartment, or to

TABLE 2

Wet Oxidation of NC-NG Propellant

| Time, PST | Over-All Slurry Strength, Wt. Pct. | Temperature, °F | | | | COD, Final Effluent mg/l 0 | pH, Final Effluent |
|---|---|---|---|---|---|---|---|
| | | Comp. 1 | Comp. 2 | Comp. 3 | Comp. 4 | | |
| 1130* | 7.5 | 450 | 445 | 440 | 435 | 1314 | 1.6 |
| 1245 | | 415 | 410 | 410 | 405 | 1244 | 1.9 |
| 1300 | | 415 | 410 | 407 | 395 | 1180 | 1.8 |
| 1315 | | 420 | 425 | 420 | 410 | 1117 | 1.8 |
| 1330 | | 435 | 435 | 420 | 412 | 1085 | 1.8 |
| 1345 | | 450 | 430 | 420 | 412 | 1065 | 1.8 |
| 1415 | 15.0 | 435 | 430 | 420 | 415 | 1703 | 1.8 |
| 1430 | | 435 | 435 | 430 | 420 | 1857 | 1.8 |
| 1445 | | 435 | 435 | 430 | 420 | 1509 | 1.7 |
| 1500 | | 435 | 435 | 435 | 430 | 1509 | 1.6 |
| 1515 | | 445 | 455 | 445 | 435 | 1656 | 1.6 |
| 1530 | | 455 | 455 | 445 | 440 | — | — |
| 1545 | | 455 | 445 | 440 | 435 | 2452 | 1.6 |
| 1600 | | 455 | 445 | 440 | 435 | 2165 | 1.6 |
| 1615 | | 450 | 440 | 435 | 430 | 2006 | 1.6 |
| 1630 | | 455 | 445 | 440 | 435 | — | — |
| Weighted Means: | | 438 | 434 | 429 | 422 | 1624 | 1.65 |

*Propellant addition to the reactor commenced at 1030; sampling began one hour later.

effect a selected reaction of the matter in the liquid phase. For example, the first compartment can be maintained at a higher temperature than the next, etc. to bring down the temperature as reduction in COD occurs during travel through the reactor, as when it is desired to attack a particular phase of the organic matter, or less oxygen containing gas can be introduced in the subsequent compartments in conformance with the COD of the liquid phase and in relation to the amount of unreacted oxygen transmitted from the previous compartment.

More important, the reaction conditions can be modified for each compartment, such as in the adjustment of the pH of the liquid phase from one compartment to the other, or by the introduction of catalyst in one or more of the compartments, in which the catalyst is selected for its ability to enhance the oxidation reaction. For example, it is known that the wet oxidation reaction normally occurs in two stages, including an initial stage in which the COD is rapidly reduced by breakdown of the large organic molecules into smaller molecules which are more difficult to oxidze and thus tend to accumulate in the liquid phase in the latter stages of the process, whereby the reaction rate may decrease by as much as one-third to one-tenth of the original rate of reaction. In a reactor of the type described, catalysts, such as copper sulfate, can be introduced with the air into the last compartments to accelerate oxidative combustion of the lower molecular weight organic component and/or lime or other neutralizing agents can be introduced into selective compartments to alter the pH conditions most favorable for oxidation of compounds which are otherwise more resistant to attack.

Similarly, the reactor can be constructed with compartments of different capacity or different wall structures or compositions to conform with the materials present in the liquid phase during processing therethrough. These ramifications are not possible in reaction towers of the type heretofore employed for wet oxidation of sewage sludge or other organic matter and it is in these factors that a more effective and efficient wet oxidation process can be formulated to produce a cleaner effluent in which COD reduction is increased to levels whereby the effluent can be drained off into streams without undesirable pollution.

It will be understood that changes may be made in the details of construction, arrangement and operation without departing from the spirit of the invention, especially as defined in the following claims.

We claim:

1. A reactor for wet oxidation of combustible organic matter in solution or dispersion in aqueous medium at elevated temperature and pressure comprising an elongate horizontally disposed housing having an inlet at one end portion for the introduction of the aqueous medium for wet oxidation and an outlet at the opposite end portion for the removal of aqueous medium which has been subjected to wet oxidation during travel through the housing, vertical walls longitudinally spaced in the housing to subdivide the housing into a number of completely separated compartments, passages communicating one compartment with another for flow of fluid therethrough from one compartment to the other and whereby the compartments are divided into a vapor zone above the level of the communicating passage and a liquid zone below the level of the communicating passage, a source of oxygen containing gas, means for introducing the oxygen containing gas into the compartment, and agitation means in compartments for maintaining the aqueous medium under a high state of agitation whereby oxygen containing gas which accumulates in the vapor space is re-entrained with aqueous medium, said means for introducing the oxygen containing gas being disposed for introduction of same in the immediate vicinity of the zone of agitation whereby the oxygen containing gas is reduced into fine droplets for intimate association with the organic matter dissolved or dispersed in aqueous medium to provide reactive oxidation sites.

2. A reactor as claimed in claim 1 in which the housing is of cylindrical shape.

3. A reactor as claimed in claim 1 in which the last compartment has an outlet in communication with the vapor zone in addition to the outlet for removal of aqueous medium which has been subjected to wet oxidation.

4. A reactor as claimed in claim 1 in which the communication passage is at a level at which 10–50 percent of the total volume of the compartment is above the passage.

5. A reactor as claimed in claim 1 in which the communicating passage is at a level at which 15–20 percent of the total volume of the compartment is above the passage.

6. A reactor as claimed in claim 1 in which the means for introduction of the oxygen containing gas is in the immediate vicinity of the highest state of agitation of the liquid phase.

7. A reactor as claimed in claim 1 in which the agitation means comprises a stirrer mounted for rotational movement about a vertical axis in the liquid phase portion of the compartment.

8. A reactor as claimed in claim 7 in which the stirrer is rotated about a vertical axis located in the central portion of the compartment.

9. A reactor as claimed in claim 1 in which the agitation means comprises a pair of vertically spaced stirrers mounted for rotational movement about a vertical axis in the central portion of the compartment with the stirrers located within the liquid zone.

10. A reactor as claimed in claim 7 in which the means for introducing the oxygen containing gas is located immediately below the stirrer for introducing the gas in a direction towards the stirrer.

11. A reactor as claimed in claim 1 in which the passages communicating one compartment with the other comprise a tubular member which extend horizontally from the one compartment to the next, a vertically disposed downpipe in the next compartment having an outlet opening at the upper end portion which extends into the vapor zone and an outlet opening at the bottom end portion which extends below the liquid level, said tubular member communicating with an intermediate portion of the downpipe.

12. A reactor as claimed in claim 1 which includes a heat exchanger within the last compartment through which the aqueous medium is circulated before introduction into the first compartment for reaction.

13. A reactor as claimed in claim 1 which includes means for heat exchange within the first compartment for the introduction of heat sufficient to raise the temperature of the aqueous medium to oxidation reaction conditions and to remove heat from the compartment when an excessive amount of heat is generated by the oxidation reaction.

14. In a process for wet oxidation of organic matter in solution of dispersion in a liquid by reaction with oxygen under elevated temperature and pressure, comprising introducing the liquid in a reaction space comprising a series of reaction zones, each reaction zone having a separate vapor space and liquid space, with the liquid being introduced into the first reaction zone in an amount to maintain the reaction space filled with liquid in each reaction zone to the extent of 50–90 percent of the volume, leaving 10–50 percent of the volume as the vapor space, subjecting the liquid to a high state of agitation in each reaction zone, and introducing oxygen containing gas into the liquid in the vicinity of high agitation whereby undissolved oxygen containing gas is distributed through the liquid as fine droplets while unreacted oxygen containing gas accumulates in the vapor space for continuous re-entrainment with the liquid under the high state of agitation.

15. A process as claimed in claim 14 in which the vapor space is maintained at about 15–20 percent of the total volume of the reaction space in each reaction zone.

16. A process as claimed in claim 14 in which the oxygen containing gas is introduced into the area of highest agitation in the liquid.

17. A process as claimed in claim 14 in which free radicals generated during the oxidation reaction are transported rapidly under the high state of agitation to oxidative reaction sites prior to expiration of the free radical to expedite the oxidation reaction whereby the reaction can be carried out at a high rate, at lower temperature with a higher percent reduction in COD.

18. A process as claimed in claim 14 in which the reaction is carried out at a temperature within the range of 400°–480°F.

19. A process as claimed in claim 14 in which the reaction is carried out at a temperature within the range of 420°–465°F.

20. A process as claimed in claim 18 in which the reaction is carried out under a pressure of 50–200 psig above the vapor pressure of water at reaction temperature.

21. A process as claimed in claim 14 in which the vapor space provides for automatic control of the reaction by compensating for variation in the rate of oxidation by steam generation.

22. A process as claimed in claim 14 comprising communicating the vapor and liquid space in one reaction zone with the next reaction zone for the transmission of vapor from the vapor space and liquid from the liquid space from the one reaction zone to the other.

23. A process as claimed in claim 22 which includes the step of separating the vapor from the liquid during the transmission from one zone to the other and introducing a separated vapor and liquid into the respective vapor and liquid spaces of the next reaction zone.

24. A process as claimed in claim 22 which includes the step of removing vapor from the vapor space and removing liquid from the liquid space in the last reaction zone.

25. A process as claimed in claim 24 which includes the step of passing the liquid in heat exchange relation with the effluent gases or liquids from the last reaction zone to preheat the liquid before introduction into the reaction space.

* * * * *